(12) United States Patent
Yang et al.

(10) Patent No.: US 11,115,879 B2
(45) Date of Patent: Sep. 7, 2021

(54) STATE SWITCHING METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/620,384

(22) PCT Filed: Sep. 8, 2017

(86) PCT No.: PCT/CN2017/101037
§ 371 (c)(1),
(2) Date: Dec. 6, 2019

(87) PCT Pub. No.: WO2019/047159
PCT Pub. Date: Mar. 14, 2019

(65) Prior Publication Data
US 2021/0007019 A1 Jan. 7, 2021

(51) Int. Cl.
*H04W 76/34* (2018.01)
*H04W 36/00* (2009.01)
(Continued)

(52) U.S. Cl.
CPC ..... *H04W 36/0033* (2013.01); *H04W 68/005* (2013.01); *H04W 76/11* (2018.02); *H04W 76/34* (2018.02)

(58) Field of Classification Search
CPC ..... H04W 76/34; H04W 76/30; H04W 76/20; H04W 76/27; H04W 36/0033; H04W 76/11; H04W 68/005
See application file for complete search history.

(56) References Cited

U.S. PATENT DOCUMENTS

2013/0310016 A1* 11/2013 Park .................. H04W 4/50
455/418
2016/0309379 A1 10/2016 Pelletier et al.
(Continued)

FOREIGN PATENT DOCUMENTS

CN  102123452  7/2011
CN  103067937  4/2013
(Continued)

OTHER PUBLICATIONS

Fan et al., "UE power saving with RRC semi-connected state in LTE," 2014 Wireless Telecommunications Symposium, Washington, DC, USA, 2014, pp. 1-5 (Year: 2014).*
(Continued)

*Primary Examiner* — Un C Cho
*Assistant Examiner* — Lalita W Pace
(74) *Attorney, Agent, or Firm* — Hodgson Russ LLP

(57) ABSTRACT

Provided are a state switching method, a network device and a terminal device. The method is used for a first terminal device in an inactive state; the inactive state indicates that the first terminal device and a network device are in a disconnection state, and the first terminal device and the network device retain context information of the first terminal device. The method includes: generating indication information, which is used to indicate the first terminal device to release the context information, or not to release the context information; and sending the indication information to the first terminal device.

17 Claims, 2 Drawing Sheets

(51) Int. Cl.
*H04W 76/11* (2018.01)
*H04W 68/00* (2009.01)

(56) References Cited

U.S. PATENT DOCUMENTS

| | | | | |
|---|---|---|---|---|
| 2017/0064671 | A1* | 3/2017 | Rashid | H04W 68/02 |
| 2018/0092061 | A1* | 3/2018 | Yamada | H04W 72/0406 |
| 2018/0092155 | A1* | 3/2018 | Hong | H04W 48/20 |
| 2018/0270791 | A1* | 9/2018 | Park | H04W 8/24 |
| 2018/0288676 | A1* | 10/2018 | Wei | H04W 48/02 |
| 2019/0254109 | A1* | 8/2019 | Lee | H04W 76/27 |
| 2019/0349838 | A1* | 11/2019 | Futaki | H04W 88/08 |
| 2020/0029262 | A1* | 1/2020 | Kim | H04W 36/30 |
| 2020/0120743 | A1* | 4/2020 | Jin | H04W 76/27 |

FOREIGN PATENT DOCUMENTS

| | | | |
|---|---|---|---|
| CN | 103139931 | 6/2013 | |
| CN | 103813300 | 5/2014 | |
| CN | 102123452 B | 5/2015 | |
| CN | 105898894 | 8/2016 | |
| RU | 2515547 | 5/2014 | |
| WO | 2015035591 | 3/2015 | |
| WO | WO-2017213687 A1 * | 12/2017 | H04W 68/005 |

OTHER PUBLICATIONS

WIPO, ISR for PCT/CN2017/101037, May 15, 2018.
RUPTO, Office Action for RU Application No. 2019142475/07(082752), dated Sep. 29, 2020.
3GPP TSG-RAN WG2 meeting #99, Report of 3GPP TSG RAN WG2 meeting #98, R2-1707601, Aug. 2017, 294 pages.
NTT DOCOMO, Inc., "UE state transition diagram for NR," 3GPP TSG-RAN WG2 #96, R2-168077, Revision of R2-167136, Nov. 2016, 7 pages.
LG Electronics Inc., "Offloading UEs in RRC_INACTIVE," 3GPP TSG-RAN WG2 Meeting #98, R2-1704542, May 2017, 2 pages.
LG Electronics Inc., "Offloading UEs in RRC_INACTIVE," 3GPP TSG-RAN2 WG2 Meeting RAN2 #99, R2-1709110, Resubmitted R2-1707147, Aug. 2017, 2 pages.
Ericsson, "RRC state machine and RRC_INACTIVE characteristics," 3GPP TSG-RAN WG2 adhoc, Tdoc R2-1700535, Jan. 2017, 11 pages.
"3rd Generation Partnership Project; Technical Specification Group Radio Access Network; NR; Radio Resource Control (RRC); Protocol specification (Release 15)," 3GPP TS 38.331, Aug. 2017, v0.0.5, 38 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, Jun. 2017, V14.3.0, 745 pages.
EPO, Office Action for EP Application No. 17924332.4, dated May 26, 2020.
Ericsson, "Text proposal to RRC connection control," 3GPP TSG-RAN WG2 #99, R2-1707848, Resubmission of R2-1707297, Aug. 2017, 7 pages.
ISDEC, Office Action for CA Application No. 3064969, dated Feb. 9, 2021.
IPI, Office Action for IN Application No. 201917050935, dated Mar. 5, 2021.

* cited by examiner

STATE SWITCHING METHOD, NETWORK DEVICE AND TERMINAL DEVICE

CROSS-REFERENCE TO RELATED APPLICATION

This application is a U.S. national phase application of International Application No. PCT/CN2017/101037, filed Sep. 8, 2017, the entire disclosure of which is incorporated herein by reference.

TECHNICAL FIELD

Embodiments of the present disclosure relate to the field of communication, and more particularly, to a state switching method, a network device, and a terminal device.

BACKGROUND

People pursue speed, delay, high-speed mobility, energy efficiency, and the business in future life is diverse and complex.

To this end, the 3rd generation partnership project (3GPP) international standards organization begins to develop the fifth generation of mobile communication technology (5G). The main application scenarios of 5G are: enhanced mobile broadband (eMBB), ultra-reliable and low latency communication (URLLC), massive machine type of communication (mMTC). In the 5G network environment, in order to reduce air interface signaling, recover wireless connections quickly, and recover data services quickly, a new radio resource control (RRC) state, that is, a radio resource control inactive (RRC_INACTIVE) state, is defined. In other words, when a terminal device is in the RRC_INACTIVE state, if downlink data arrives, the core network sends the data to each network device (for example, a base station), and the network device triggers a paging message to the terminal device for evoking the terminal device to enter a connected state to receive the data.

SUMMARY

A state switching method, a network device, and a terminal device are provided.

In a first aspect, a state switching method is provided, and applied to a first terminal device in an inactive state indicating that the first terminal device and a network device are in a disconnection state, and the first terminal device and the network device retain context information of the first terminal device.

The method includes:

generating indication information, which is used to indicate the first terminal device to release the context information, or not to release the context information; and sending the indication information to the first terminal device.

In the embodiment of the present disclosure, the network device can effectively release network resources and relieve network loads by batch uninstalling terminal devices, which have certain characteristics and are in an inactive state.

In some possible implementations, the generating indication information includes:

generating a bit sequence, which includes at least one bit corresponding to at least one terminal device group. The data carried on each bit is used to indicate whether a terminal device in a corresponding terminal device group releases the context information. A first terminal device group in the at least one terminal device group include the first terminal device; wherein, sending the indication information to the first terminal device includes:

sending the bit sequence to the first terminal device.

In the embodiment of the present disclosure, the network device generates the bit sequence by means of a bitmap and sends the bit sequence to the terminal device, and the network device can effectively release network resources and relieve network loads by batch uninstalling terminal devices, which have certain characteristics and are in an inactive state, thus improving user experience.

In some possible implementations, generating a bit sequence includes:

generating the bit sequence in the following manner:

when determining the terminal device in the first terminal device group releases the context information, setting a value carried on a first bit corresponding to the first terminal device group as 1, and when determining the terminal device in the first terminal device group does not release the context information, setting the value carried on the first bit as 0.

In some possible implementations, the at least one terminal device group is configured with different characteristic information, and the terminal device in each terminal device group is configured with the same characteristic information, wherein the characteristic information is information obtained by the network device from a core network device or the terminal device and is used for representing attributes of the terminal device.

In some possible implementations, the characteristic information includes any one of the following information:

a service type supporting by the terminal device, an access class value, a service habit behavior, a device type, network slice information, quality of service, a user priority corresponding to the terminal device, and a user class.

In some possible implementations, the method further includes:

sending criterion information to the first terminal device, herein, the criterion information is used to determine whether to release the context information by the first terminal device.

In some possible implementations, the criterion information includes a first threshold, so that the first terminal device releases the context information when determining that the indication information indicates the first terminal device to release the context information and a remainder between an identifier of the first terminal device and a second threshold is equal to the first threshold.

In some possible implementations, the criterion information further includes the second threshold.

In some possible implementations, the indication information is a first identifier stamp for identifying the first terminal device, wherein sending the indication information to the first terminal device includes:

sending the first identifier stamp to the first terminal device, when determining that it is indicated that the first terminal device releases the context information.

In some possible implementations, the first identifier stamp corresponds to at least one of the following information:

the service type supporting by the terminal device, the access class value, the service habit behavior, the device type, the network slice information, the quality of service, the user priority corresponding to the first terminal device, and the user class.

In some possible implementations, the identifier stamp is configured with identifier information of the network device.

In some possible implementations, sending the indication information to the first terminal device includes:

sending a system message to the first terminal device, herein, the system message includes the indication information and the identifier information of the network device; or sending a paging message to the first terminal device, herein, the paging message includes the indication information and the identifier information of the network device.

sending the indication information to the first terminal device, includes:

sending the paging message to the first terminal device, herein the paging message includes the identifier information of the first terminal device and the indication information.

In a second aspect, a state switching method is provided, and applied to a first terminal device in an inactive state indicating that the first terminal device and a network device are in a disconnection state, and the first terminal device and the network device retain context information of the first terminal device.

The method includes:

receiving indication information sent by a network device, herein, the indication information is used to indicate the first terminal device to release the context information, or not to release the context information; and determining whether to release the context information according to the indication information.

In some possible implementations, the indication information sent by a network device includes:

receiving a bit sequence sent by the network device, herein, the bit sequence includes at least one bit corresponding to at least one terminal device group, and data carried on each bit is used to indicate whether a terminal device in a corresponding terminal device group releases the context information; determining a first terminal device group to which the first terminal device belongs, wherein the first terminal device group is included in the at least one terminal device group; obtaining a value carried on a first bit corresponding to the first terminal device group; wherein, determining whether to release the context information according to the indication information include:

determining whether to release the context information according to the value carried on the first bit.

In some possible implementations, determining whether to release the context information according to the value carried on the first bit includes:

when the value carried on the first bit is 1, determining to release the context information; or, when the value carried on the first bit is 0, determining not to release the context information.

In some possible implementations, the at least one terminal device group is configured with different characteristic information, and the terminal device in each terminal device group is configured with the same characteristic information, wherein the characteristic information is the information which is obtained by the network device from a core network device or the terminal device and is used for representing attributes of the terminal device.

In some possible implementations, the characteristic information includes any one of the following information:

a service type supporting by the terminal device, an access class value, a service habit behavior, a device type, network slice information, quality of service, a user priority corresponding to the terminal device, and a user class.

In some possible implementations, the method further includes:

receiving criterion information sent by the network device, herein, the criterion information is used by the first terminal device to determine whether to release the context information.

In some possible implementations, the criterion information includes a first threshold; wherein determining whether to release the context information according to the indication information, including:

when the value carried on the first bit is 1, and remainder between an identifier of the first terminal device and a second threshold is equal to the first threshold, determining to release the context information.

In some possible implementations, the criterion information further includes the second threshold.

In some possible implementations, the indication information is a first identifier stamp for identifying the first terminal device; wherein, determining whether to release the context information according to the indication information includes:

when receiving the first identifier stamp sent by the network device, determining to release context information.

In some possible implementations, the first identifier stamp corresponds to at least one of the following information:

the service type supporting by the terminal device, the access class value, the service habit behavior, the device type, the network slice information, the quality of service, the user priority corresponding to the first terminal device, and the user class.

In some possible implementations, the identifier stamp is configured with identifier information of the network device.

In some possible implementations, receiving indication information sent by a network device includes:

receiving a system message sent by the network device, herein, the system message including the indication information and the identifier information of the network device; or receiving a paging message sent by the network device, herein, the paging message includes the indication information and the identifier information of the network device.

In some possible implementations, receiving indication information sent by a network device includes:

receiving the paging message sent by the network device, the paging message including the identifier information of the first terminal device and the indication information.

In a third aspect, a network device is provided, including:

a generating unit, configured to generate indication information, herein, the indication information is used to indicate a first terminal device to release context information, or not to release the context information; wherein the first terminal device is in an inactive state indicating that the first terminal device and the network device are in a disconnection state, and the first terminal device and the network device retain the context information of the first terminal device; and a transceiving unit, configured to send the indication information to the first terminal device.

In a fourth aspect, a network device is provided, including:

a processor, configured to generate indication information, herein, the indication information is used to indicate a first terminal device to release context information, or not to release the context information; wherein the first terminal device is in an inactive state indicating that the first terminal device and the network device are in a disconnection state, and the first terminal device and the network device retain the context information of the first terminal device; and a transceiver, configured to send the indication information to the first terminal device.

In a fifth aspect, a terminal device is provided, including:

a transceiving unit, configured to receive indication information sent by a network device, herein, the indication information is used to indicate a first terminal device to release context information, or not to release the context information; wherein the first terminal device is in an inactive state indicating that the first terminal device and the network device are in a disconnection state, and the first terminal device and the network device retain the context information of the first terminal device; and a processing unit, configured to determine whether to release the context information according to the indication information.

In a sixth aspect, a terminal device is provided, including:

a transceiver, configured to receive indication information sent by a network device, the indication information being used to indicate a first terminal device to release context information, or not to release the context information; wherein the first terminal device is in an inactive state, the inactive state indicating that the first terminal device and the network device are in a disconnection state, and the first terminal device and the network device retain the context information of the first terminal device; and a processor, configured to determine whether to release the context information according to the indication information.

In a seventh aspect, a computer readable medium is provided for storing a computer program, wherein the computer program includes instructions for performing the method embodiment of the first aspect or the second aspect described above.

In an eighth aspect, a computer chip is provided, including: an input interface, an output interface, at least one processor, and a memory; wherein the processor is configured to execute codes in the memory, and when the codes are executed, the processor can implement various processes performed by the network device in the state switching method in the first aspect and various implementations described above.

In a ninth aspect, a computer chip is provided, including: an input interface, an output interface, at least one processor, and a memory; wherein the processor is configured to execute codes in the memory, and when the codes are executed, the processor can implement various processes performed by the terminal device in the state switching method in the second aspect and various implementations described above.

In a tenth aspect, a communication system is provided, including the network device as described above, and the terminal device described above.

DETAILED DESCRIPTION

Figure 1:
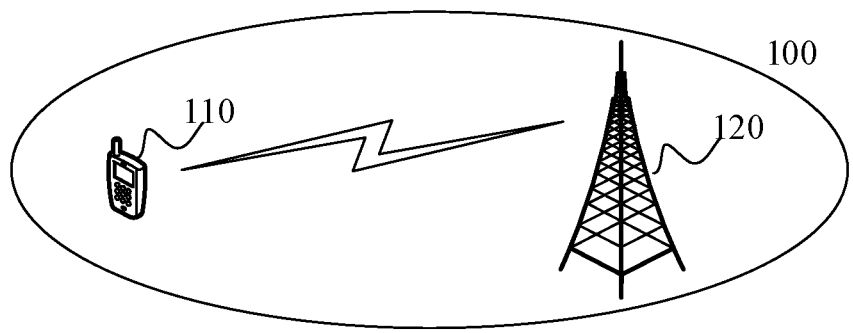
FIG. 1 is an example of an application scenario of an embodiment of the present disclosure.

FIG. 1 is a schematic diagram of a communication system in accordance with an embodiment of the present disclosure.

As shown in FIG. 1, a communication system 100 can include a terminal device 110 and a network device 120. The network device 120 can communicate with the terminal device 110 through an air interface. Multi-service transmission is supported between the terminal device 110 and the network device 120. The terminal device 110 may be in a RRC_INACTIVE state.

The RRC_INACTIVE state is different from a radio resource control idle (RRC_IDLE) state and a radio resource control active (RRC_ACTIVE) state. To facilitate the understanding of the solution, a brief introduction is used to describe the terminal device in the RRC_INACTIVE state.

Specifically, for the RRC_IDLE state, there is no RRC connection between the terminal device and the network device, and the network device does not store context information of the terminal device. When there is a need to page the terminal device, the paging is initiated by a core network, and the paging area is configured by the core network. Its mobility is based on cell selection or cell reselection based on the terminal device. For the RRC_ACTIVE state, there is an RRC connection between the terminal device and the network device, and the network device and the terminal device store the context information of the terminal device. The location of the terminal device obtained by the network device is at a specific cell level. Its mobility is the mobility controlled by the network device.

However, for the RRC_INACTIVE state, there is a connection between the core network (CN) and the network device, and the context information of the terminal device exists on a certain network device, and the paging is triggered by an radio access network (RAN) managing its paging area, that is, the location of the terminal device obtained by the network device is at the RAN paging area level. Its mobility is cell selection or cell reselection based on the terminal device. In other words, the connection between the terminal device in the RRC_INACTIVE state and the network device is in a disconnected state, and the network device retains the context information of the terminal device, and the context information is used to quickly establish a connection between the terminal device and the network device.

For example, it is assumed that the terminal device is in the RRC_INACTIVE state, the network device configures the terminal device with the paging area of the RAN, and the paging area of the RAN may include multiple cells. That is to say, when performing cell reselection, the terminal device may trigger the terminal device to resume the RRC connection based on the paging area of the RAN.

Specifically, when the terminal device performs the cell reselection, if the terminal device moves within the paging area of the RAN, the network device is not notified, and more specifically, the terminal device may follow the mobility behavior under the RRC_IDLE, that is, follow the cell selection and reselection principle under RRC_IDLE to perform the cell reselection. If the terminal device moves out of the paging area of the RAN, the terminal device may be triggered to resume the RRC connection and re-obtain the paging area configured by the network device.

In other words, when the downlink data arrives at the terminal device, the network device that maintains the connection between the RAN and the core network for the terminal device triggers all cells within the RAN paging area to send the paging message to the terminal device, so that the terminal in the RRC_INACTIVE state can resume the RRC connection and receive data. When the uplink data arrives, the terminal device triggers a random access procedure to access the network for data transmission.

However, the scenario of the 5G network faces to huge amounts of terminals.

In some IoT scenarios, services of the terminal are active for a period of time, and other times are silent. That is to say, there may be a large number of terminal devices in the RRC_INACTIVE state in the 5G network, causing severe load on the base station side and the core network side, or the connection capacity between the base station side and limiting the core network, causing the terminal device being unable to enter the RRC_INACTIVE state, and then leading to poor user experience.

In the embodiment of the present disclosure, a state switching method is provided. The purposes of releasing network resources and relieving network loads can be achieved by batch uninstalling terminal devices, which have certain characteristics and are in an inactive state.

It should be understood that the embodiments of the present disclosure are applicable to any communication system including the terminal device in the RRC_INACTIVE state. That is, the embodiment of the present disclosure is exemplified only by the communication system 100, but the embodiment of the present disclosure is not limited thereto. The technical solution of the embodiment of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE time division duplex (TDD), and an universal mobile telecommunication system (UMTS).

The present disclosure describes various embodiments in connection with the network device and the terminal device.

The network device 120 may refer to any entity on the network side that is used to send or receive signals. For example, it may be a device communication of a machine type communication (MTC), a base transceiver station (BTS) in the GSM system or the CDMA system, or a node base (NodeB, NB) in the WCDMA system, or an evolutional node base (eNB or eNodeB) in the LTE system, or a base station equipment in the 5G network.

Further, the terminal device 110 may be any terminal device. Specifically, the terminal device 110 can communicate with one or more core networks via an radio access network (RAN), and can also be referred to as an access terminal, a user equipment, a subscriber unit, a subscriber station, a mobile station, a remote station, a remote terminal, a mobile device, a user terminal, a terminal, a wireless communication device, a user agent, or a user device. For example, it can be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a future evolutional public land mobile network (PLMN), and so on.

The implementation manner of the state switching method in the embodiment of the present disclosure is specifically described below.

Figure 2:
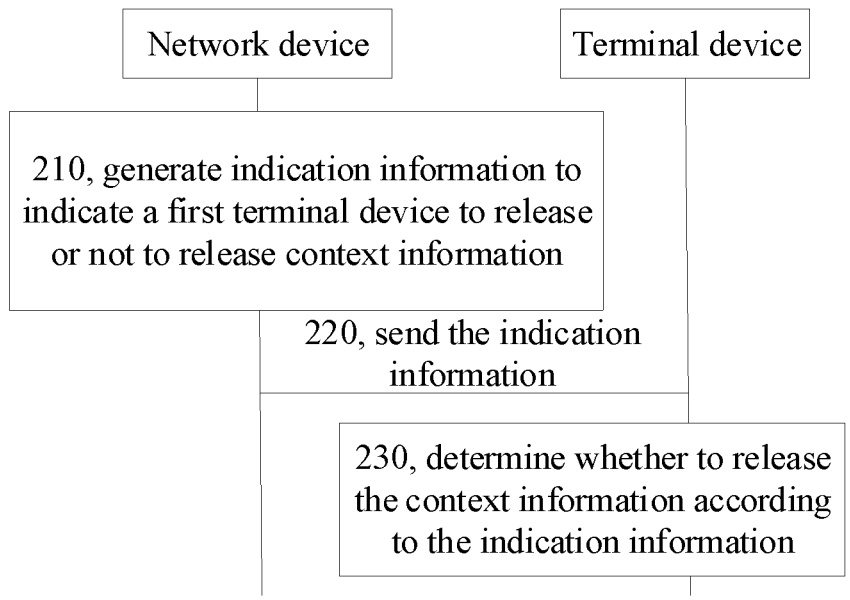
FIG. 2 is a schematic flowchart of a state switching method according to an embodiment of the present disclosure.

FIG. 2 is a schematic flowchart of a state switching method according to an embodiment of the present disclosure.

As shown in FIG. 2, the method includes the followings.

In 210, a network device is used to generate the indication information, herein, the indication information is used to indicate the first terminal device to release the context information, or not to release the context information.

In 220, a network device is used to send the indication information to the first terminal device.

In 230, a first terminal device is used to determine whether to release the context information, according to the indication information.

Specifically, the network device generates indication information, herein, the indication information is used to indicate the first terminal device to release the context information, or not to release the context information; and sends the indication information to the first terminal device. In other words, after receiving the indication information sent by the network device, the terminal device determines whether to release the context information according to the indication information.

It should be understood that the data transmission method in the embodiment of the present disclosure may be applied to the terminal device in the inactive state, the inactive state indicating that the terminal device and the first network device retain the context information of the terminal device and a communication connection of the terminal device is retained between the first network device and the core network device.

As an embodiment, the network device may generate a bit sequence, herein, the bit sequence includes at least one bit corresponding to at least one terminal device group, and data carried on each bit is used to indicate whether a terminal device in a corresponding terminal device group releases the context information, and a first terminal device group in the at least one terminal device group includes the first terminal device; and the bit sequence is sent to the first terminal device.

For example, the network device can generate the bit sequence in the following manner:

when determining the terminal device in the first terminal device group releases the context information, the network device sets a value carried on a first bit corresponding to the first terminal device group as 1, while determining the terminal device in the first terminal device group does not release the context information, the network device sets the value carried on the first bit as 0.

In other words, the first terminal device receives the bit sequence sent by the network device; the first terminal device determines the first terminal device group to which the first terminal device belongs, and the at least one terminal device group includes the first terminal device; the value carried on the first bit corresponding to the first terminal device group is obtained; and it is determined whether to release the context information according to the value carried on the first bit.

Specifically, when the value carried on the first bit is 1, it is determined to release the context information; or, when the value carried on the first bit is 0, it is determined not to release the context information.

It is to be noted that the at least one terminal device group is configured with different characteristic information, and the terminal device in each terminal device group is configured with the same characteristic information, wherein the characteristic information is information which is obtained by the network device from a core network device or the terminal device and is used for representing attributes of the terminal device.

In the embodiment of the present disclosure, the network device can indicate that the terminal device corresponding to the specific characteristic information releases the context information. For example, the network device can notify the terminal device having the specified access class value to release the context information and return to the idle state.

For example, each terminal device or user defines an access class (AC) value for characterizing the priority of the terminal device or the user. During the process establishing the RRC connection between the terminal device and the network device, the AC value of the terminal device is reported to the network device. The network device will issue the command of releasing the context within all of the area sets of the paging area of all terminal devices where the context information is stored in the network device.

In other words, in the embodiment of the present disclosure, because the access class values have many values, in order to indicate the context release situation of the terminal device corresponding to each access class value, the network device may use a bitmap form to identify whether the terminal device corresponding to the access class value releases the context information. Specifically, the network device forms a bit sequence in a bitmap manner, and sends the bit sequence to the terminal device.

For example, the network device sets the bit on the bitmap corresponding to the access class value equal to 5 as 1 to identify to release context information, and 0 represents not to release the context information.

It should be understood that the foregoing AC value is only an example of the characteristic information of the embodiment of the present disclosure, and the embodiment of the present disclosure is not limited thereto. For example, it should be understood that the characteristic information in the embodiment of the present disclosure may include any one of the following information: a service type supporting by the terminal device, an access class value, a service habit behavior, a device type, network slice information, quality of service, a user priority corresponding to the terminal device, and a user class.

In other words, the bitmap may be a bitmap of the access class, or may be replaced with a bitmap of the terminal device type, a bitmap of the user priority/level, a bitmap of the service type, a bitmap bearing a quality of service class identifier (QCI) and a bitmap of the network slice, etc.

More specifically, for the bitmap of the service type and the bitmap bearing the QCI, the blacklist is used to indicate that the context information is released, if a certain service type indicated by the bitmap or the bear indicated by the QCI is not included; or a whitelist is used to indicate that the context information is not released, if a certain service type indicated by the bitmap or the bear indicated by the QCI is included; otherwise it is released.

The following describes an embodiment of the present disclosure by taking the characteristic information being the access class value as an example.

It is assumed that the access class value of the terminal device can be divided into 0~15, wherein, 0~9 represents the ordinary user, 11 represents the public land mobile network (PLMN) management, and 12 represents the security department application, 13 represents the public service department, 14 represents emergency services and 15 represents PLMN staff. Optionally, these access class values of 11-15 generally have higher priority, but these numbers do not represent the priority order.

In the embodiment of the present disclosure, the bit sequence may be a sequence of 16 bits in length, for example, 0000000000000000. That is, the network device may control the terminal device to release the context information by using the access class value. For example, the first bit may identify whether the user whose access class value is equal to 0 releases the context information, and the second bit may identify whether the user whose access class value is equal to 1 releases the context information, and so on.

More specifically, for example, it is assumed that the access class value of the first terminal device is 1. After receiving the bit sequence, the first terminal device determines whether to release the context information according to the data carried on the second bit in the bit sequence. For example, when the value carried on the second bit is 1, the context information is released, and when the value carried on the second bit is 0, the context information is not released.

In the embodiment of the present disclosure, some terminal devices in the at least one terminal device group release the context information.

Optionally, the network device may send the criterion information to the first terminal device, the criterion information being used by the first terminal device to determine whether to release the context information.

Specifically, the criterion information includes a first threshold, so that the first terminal device releases the context information when determining that the indication information indicates the first terminal device to release the context information and remainder between an identifier of the first terminal device and a second threshold is equal to the first threshold.

For another example, the criterion information further includes the second threshold.

Specifically, in order to make some terminal devices in the at least one terminal device group to release the context information, one or two values A and B are also configured while the bitmap is configured. When the remainder of the identifier of the context information of the first terminal device and the A is equal to B, and the value of the bit corresponding to the access class of the first terminal device is set as 1, the context information is released, otherwise it is not released.

Further, if only one value is configured, A is a fixed value, for example, 1024. That is, when the identifier of the context information of the first terminal device is equal to B, and the value of the bit corresponding to the access class of the first terminal device is set to 1, it is released, otherwise it is not released.

In another embodiment, the indication information is a first identifier stamp for identifying the first terminal device; specifically, when the network device determines to indicate the first terminal device to release the context information, the network device sends the first identifier stamp to the first terminal device.

Optionally, the first identifier stamp corresponds to at least one of the following information:

the service type supporting by the terminal device, the access class value, the service habit behavior, the device type, the network slice information, the quality of service, the user priority corresponding to the first terminal device, and the user class.

Optionally, the identifier stamp is configured with the identifier information of the network device.

Optionally, sending the indication information to the first terminal device includes:

sending a system message to the first terminal device, herein the system message includes the indication information and the identifier information of the network device; or sending a paging message to the first terminal device, herein the paging message includes the indication information and the identifier information of the network device.

As another embodiment, the network device may send a paging message to the first terminal device, herein, the paging message includes the identifier information of the first terminal device and the indication information. In other words, when the paging message is used to separately indicate that the first terminal device releases the context information, it is necessary to add the indication information of the context information and the indication of releasing the context information into the paging message.

Figure 3:
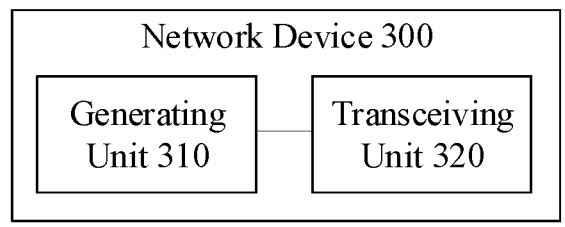
FIG. 3 is a schematic block diagram of a network device according to an embodiment of the present disclosure.

FIG. 3 is a schematic block diagram of a network device 300 according to an embodiment of the present disclosure.

As shown in FIG. 3, the network device 300 includes:

a generating unit 310, configured to generate indication information, herein, the indication information is used to indicate a first terminal device to release context information, or not to release the context information; wherein the first terminal device is in an inactive state, the inactive state indicating that the first terminal device and the network device are in a disconnection state, and the first terminal device and the network device retain the context information of the first terminal device.

A transceiving unit 320 is configured to send the indication information to the first terminal device.

Optionally, the generating unit 310 is specifically configured to:

generate a bit sequence, herein, the bit sequence includes at least one bit corresponding to at least one terminal device group, and the data carried on each bit is used to indicate whether a terminal device in a corresponding terminal device group releases the context information, and a first terminal device group in the at least one terminal device group includes the first terminal device; wherein the transceiving unit 320 is specifically configured to:

send the bit sequence to the first terminal device.

Optionally, the generating unit 310 is more specifically configured to:

generate the bit sequence in the following manner:

when determining the terminal device in the first terminal device group releases the context information, setting a value carried on a first bit corresponding to the first terminal device group as 1, while determining the terminal device in the first terminal device group does not release the context information, setting the value carried on the first bit as 0.

Optionally, the at least one terminal device group is configured with different characteristic information, and the terminal device in each terminal device group is configured with the same characteristic information, wherein the characteristic information is the information which is obtained by the network device from a core network device or the terminal device and is used for representing attributes of the terminal device.

Optionally, the characteristic information includes any one of the following information:

a service type supporting by the terminal device, an access class value, a service habit behavior, a device type, network slice information, quality of service, a user priority corresponding to the terminal device, and a user class.

Optionally, the transceiving unit 320 is further configured to:

send criterion information to the first terminal device, herein, the criterion information is used by the first terminal device to determine whether to release the context information.

Optionally, the criterion information includes a first threshold, so that the first terminal device releases the context information when determining that the indication information indicates the first terminal device to release the context information and remainder between an identifier of the first terminal device and a second threshold is equal to the first threshold.

Optionally, the criterion information further includes the second threshold.

Optionally, the indication information is a first identifier stamp for identifying the first terminal device, where the transceiving unit 320 is specifically configured to:

Send the first identifier stamp the first terminal device when determining that it is indicated that the first terminal device releases the context information.

Optionally, the first identifier stamp corresponds to at least one of the following information:

the service type supporting by the terminal device, the access class value, the service habit behavior, the device type, the network slice information, the quality of service, the user priority corresponding to the first terminal device, and the user class.

Optionally, the identifier stamp is configured with identifier information of the network device.

Optionally, the transceiving unit 320 is specifically configured to:

send a system message to the first terminal device, herein, the system message includes the indication information and the identifier information of the network device; or sending a paging message to the first terminal device, herein, the paging message includes the indication information and the identifier information of the network device.

Optionally, the transceiving unit 320 is specifically configured to:

send the paging message to the first terminal device, herein, the paging message includes the identifier information of the first terminal device and the indication information.

Figure 4:
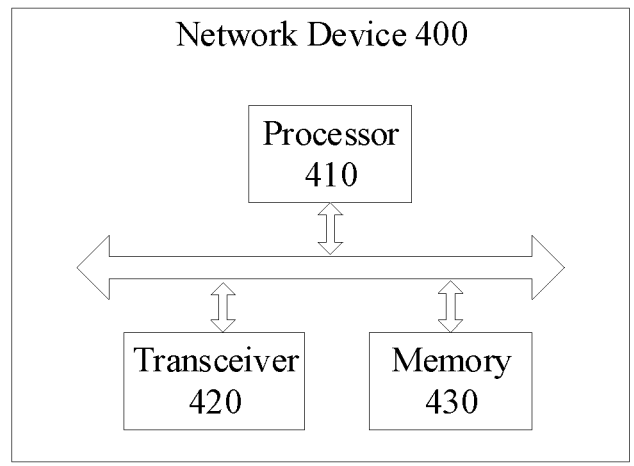
FIG. 4 is another schematic block diagram of a network device according to an embodiment of the present disclosure.

It should be noted that the generating unit 310 can be implemented by a processor, and the transceiving unit 320 can be implemented by a transceiver. As shown in FIG. 4, the network device 400 can include a processor 410, a transceiver 420, and a memory 430. The memory 430 can be used to store indication information, and can also be used to store codes, and instructions executed by the processor 410. The various components in the network device 400 are connected by a bus system, wherein the bus system includes a power bus, a control bus, and a status signal bus in addition to the data bus.

The network device 400 shown in FIG. 4 can implement the various processes implemented by the network device in the foregoing method embodiment shown in FIG. 2. To avoid repetition, details are not described herein again.

Figure 5:
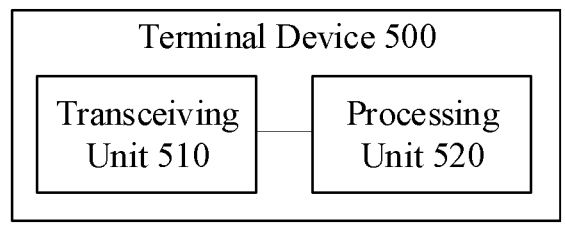
FIG. 5 is a schematic block diagram of a terminal device according to an embodiment of the present disclosure.

FIG. 5 is a schematic block diagram of a terminal device 500 according to an embodiment of the present disclosure.

As shown in FIG. 5, the terminal device 500 includes:

a transceiving unit 510, configured to receive indication information sent by a network device, herein, the indication information is used to indicate a first terminal device to release context information, or not to release the context information; wherein the first terminal device is in an inactive state indicating that the first terminal device and the network device are in a disconnection state, and the first terminal device and the network device retain the context information of the first terminal device.

A processing unit 520 is configured to determine whether to release the context information according to the indication information.

Optionally, the transceiving unit 510 is specifically configured to:

receive a bit sequence sent by the network device, herein, the bit sequence includes at least one bit including at least one bit, the at least one bit corresponding to at least one terminal device group, and the data carried on each bit is used to indicate whether a terminal device in a corresponding terminal device group releases the context information; wherein the processing unit 520 is specifically configured to:

determine a first terminal device group to which the first terminal device belongs, herein, the at least one terminal device group includes the first terminal device group; obtain a value carried on a first bit corresponding to the first terminal device group; and determines whether to release the context information according to the value carried on the first bit.

Optionally, the processing unit 520 is more specifically configured to:

when the value carried on the first bit is 1, determine to release the context information; or, when the value carried on the first bit is 0, determine not to release the context information.

Optionally, the at least one terminal device group is configured with different characteristic information, and the terminal device in each terminal device group is configured with the same characteristic information, wherein the characteristic information is information which is obtained by the network device from a core network device or the terminal device and is used for representing attributes of the terminal device.

Optionally, the characteristic information includes any one of the following information:

a service type supporting by the terminal device, an access class value, a service habit behavior, a device type, network slice information, quality of service, a user priority corresponding to the terminal device, and a user class.

Optionally, the transceiving unit 510 is further configured to:

receive criterion information sent by the network device, the criterion information being used by the first terminal device to determine whether to release the context information.

Optionally, the criterion information includes a first threshold; wherein the processing unit 520 is more specifically configured to:

when the value carried on the first bit is 1, and remainder between an identifier of the first terminal device and a second threshold is equal to the first threshold, determine to release the context information.

Optionally, the criterion information further includes the second threshold.

Optionally, the indication information is a first identifier stamp for identifying the first terminal device; wherein the processing unit 520 is more specifically configured to:

when receiving the first identifier stamp sent by the network device, determine to release the context information.

Optionally, the first identifier stamp corresponds to at least one of the following information:

the service type supporting by the terminal device, the access class value, the service habit behavior, the device type, the network slice information, the quality of service, the user priority corresponding to the first terminal device, and the user class.

Optionally, the identifier stamp is configured with identifier information of the network device.

Optionally, the transceiving unit 510 is specifically configured to:

receive a system message sent by the network device, herein, the system message includes the indication information and the identifier information of the network device; or receive a paging message sent by the network device, herein, the paging message includes the indication information and the identifier information of the network device.

Optionally, the transceiving unit 510 is specifically configured to:

receive the paging message sent by the network device, herein, the paging message includes the identifier information of the first terminal device and the indication information.

Figure 6:
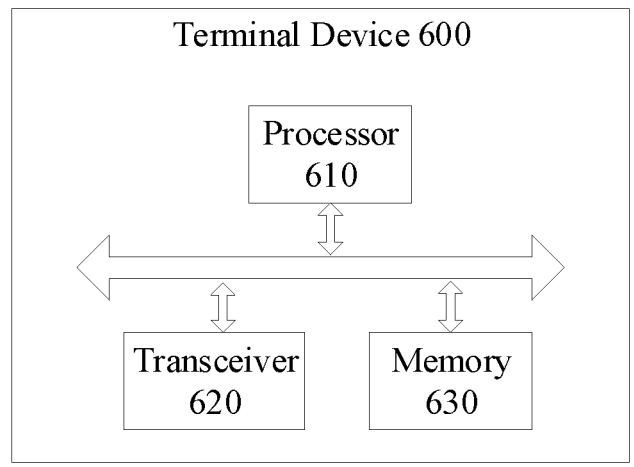
FIG. 6 is another schematic block diagram of a terminal device according to an embodiment of the present disclosure.

It should be noted that the transceiving unit 510 can be implemented by a transceiver, and the processing unit 520 can be implemented by a processor. As shown in FIG. 6, the terminal device 600 can include a processor 610, a transceiver 620, and a memory 630. The memory 630 can be used to store indication information, and can also be used to store codes, instructions, and the like executed by the processor 610. The various components in the terminal device 600 are connected by a bus system, wherein the bus system includes a power bus, a control bus, and a status signal bus in addition to the data bus.

The terminal device 600 shown in FIG. 6 can implement the various processes implemented by the terminal device in the foregoing method embodiment shown in FIG. 2. To avoid repetition, details are not described herein again.

That is to say, the method embodiment in the embodiment of the present disclosure may be applied to a processor or implemented by a processor. In the implementation process, each step of the foregoing method embodiment may be completed by an integrated logic circuit of hardware in the processor or an instruction in a form of software. More specifically, the steps of the methods disclosed in the embodiments of the present disclosure may be directly implemented by the hardware decoding processor, or may be performed by a combination of hardware and software modules in the decoding processor. The software modules can be located in a conventional storage medium such as a random access memory, a flash memory, a read only memory, a programmable read only memory or an electrically erasable programmable memory, and a register. The storage medium is located in the memory, and the processor reads the information in the memory and completes the steps of the above methods with its hardware.

Wherein, the processor may be an integrated circuit chip with signal processing capabilities, which can implement or execute the methods, steps, and logic blocks disclosed in the embodiments of the present disclosure. For example, the above processor may be general purpose processors, digital signal processors (DSPs), application specific integrated circuits (ASICs), field programmable gate arrays (FPGAs) or other programmable logic devices, discrete gates or transistor logic devices, discrete hardware components, and so on. Further, the general purpose processor may be a microprocessor can also be any conventional processor, and so on.

Moreover, in the embodiments of the present disclosure, the memory in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (EPROM), or an electrically EPROM (EEPROM) or flash memory. The volatile memory can be a random access memory (RAM) that acts as an external cache. By way of example and not limitation, many forms of RAM are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a synchlink DRAM (SL-DRAM)) and a direct rambus RAM (DR RAM). It should be noted that the memory of the system and method described herein are intended to include, without being limited to, these and any other suitable types of memory.

In the end, it is to be noted that the terms used in the embodiments of the present disclosure and the appended claims are for the purpose of describing particular embodiments, and are not intended to limit the embodiments of the present disclosure.

For example, as used in the embodiments of the present disclosure and the appended claims, the singular forms "a", "said", and "the" are intended to include the plural forms as well, unless the context clearly indicates otherwise.

For another example, the terms a first network device and a second network device may be used in embodiments of the present disclosure, but these network devices should not be limited to these terms. These terms are only used to distinguish network devices from each other.

For another example, depending on the context, the word "when . . . " as used herein may be interpreted as "if" or "upon . . . " or "in response to a determination" or "in response to a detection". Similarly, depending on the context, the phrase "if determined" or "if detected (stated condition or event)" may be interpreted as "when determined" or "in response to a determination" or "when detected (stated condition or event)" or "in response to a detection (stated condition or event)".

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the corresponding process in the foregoing method embodiment, and details are not described herein again.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one monitoring unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A state switching method, comprising:
receiving, by a first terminal device, indication information sent by a network device, the first terminal device being in an inactive state indicating that the first terminal device and the network device are in a disconnection state, and the first terminal device and the network device retaining context information of the first terminal device, the indication information being used to indicate the first terminal device to release the context information, or not to release the context information; and
determining whether to release the context information according to the indication information,
wherein receiving, by the first terminal device, indication information sent by the network device comprises:
receiving a bit sequence sent by the network device, the bit sequence comprising at least two bits corresponding to at least two terminal device groups each including a plurality of terminal devices, and data carried on each bit being used to indicate whether a terminal device in a corresponding terminal device group releases the context information;

determining a first terminal device group to which the first terminal device belongs, the at least two terminal device groups comprising the first terminal device group; and obtaining a value carried on a first bit corresponding to the first terminal device group;

wherein, determining whether to release the context information according to the indication information comprises:

determining whether to release the context information according to the value carried on the first bit.

2. The method according to claim 1, wherein determining whether to release the context information according to the value carried on the first bit comprises:

in response to the value carried on the first bit being 1, determining to release the context information; or, in response to the value carried on the first bit being 0, determining not to release the context information.

3. The method according to claim 1, wherein:

the at least two terminal device groups are configured with different characteristic information, and the terminal device in each terminal device group is configured with same characteristic information, wherein the characteristic information is information which is obtained by the network device from a core network device or the terminal device and is used for representing attributes of the terminal device.

4. The method according to claim 3, wherein the characteristic information comprises any one of the following information:

a service type supporting by the terminal device, an access class value, a service habit behavior, a device type, network slice information, quality of service, a user priority corresponding to the terminal device, and a user class.

5. The method according to claim 1, wherein the indication information is a first identifier stamp for identifying the first terminal device;

wherein, determining whether to release the context information according to the indication information comprises:

in response to receiving the first identifier stamp sent by the network device, determining to release context information.

6. The method according to claim 5, wherein the first identifier stamp corresponds to at least one of the following information:

a service type supporting by the terminal device, an access class value, a service habit behavior, a device type, a network slice information, a quality of service, a user priority corresponding to the first terminal device, and a user class.

7. The method according to claim 5, wherein the identifier stamp is configured with identifier information of the network device.

8. The method according to claim 1, wherein receiving indication information sent by a network device comprises:

receiving a system message sent by the network device, the system message comprising the indication information and identifier information of the network device; or receiving a paging message sent by the network device, the paging message comprising the indication information and the identifier information of the network device.

9. The method according to claim 1, wherein receiving indication information sent by a network device comprises:

receiving a paging message sent by the network device, the paging message comprising identifier information of the first terminal device and the indication information.

10. A network device, comprising a processor, a transceiver, and a non-transitory memory, wherein when code stored in the non-transitory memory is executed by the processor, the network device is caused to:

generate, by the processor, indication information, the indication information being used to indicate a first terminal device to release context information, or not to release the context information; wherein the first terminal device is in an inactive state, the inactive state indicating that the first terminal device and the network device are in a disconnection state, and the first terminal device and the network device retain the context information of the first terminal device; and send, by the transceiver, the indication information to the first terminal device, wherein the processor is configured to:

generate a bit sequence comprising at least two bits, the at least two bits corresponding to at least two terminal device groups each including a plurality of terminal devices, data carried on each bit being used to indicate whether a terminal device in a corresponding terminal device group releases the context information, and a first terminal device group in the at least two terminal device groups comprising the first terminal device;

wherein the transceiver is configured to:

send the bit sequence to the first terminal device.

11. The network device according to claim 10, wherein the processor is configured to:

generate the bit sequence in the following manner:

in response to determining the terminal device in the first terminal device group releases the context information, setting a value carried on a first bit corresponding to the first terminal device group as 1, and in response to determining the terminal device in the first terminal device group does not release the context information, setting the value carried on the first bit as 0.

12. The network device according to claim 10, wherein the at least two terminal device groups are configured with different characteristic information, and the terminal device in each terminal device group is configured with same characteristic information, wherein the characteristic information is information which is obtained by the network device from a core network device or the terminal device and is used for representing attributes of the terminal device.

13. The network device according to claim 12, wherein the characteristic information comprises any one of the following information:

a service type supporting by the terminal device, an access class value, a service habit behavior, a device type, network slice information, quality of service, a user priority corresponding to the terminal device, and a user class.

14. A terminal device, comprising a processor, a transceiver, and a non-transitory memory, wherein when code stored in the non-transitory memory is executed by the processor, the terminal device is caused to:

receive, by the transceiver, indication information sent by a network device, the indication information being used to indicate a first terminal device to release context information, or not to release the context information;

wherein the first terminal device is in an inactive state indicating that the first terminal device and the network device are in a disconnection state, and the first terminal device and the network device retain the context information of the first terminal device; and determine, by the processor, whether to release the context information according to the indication information, wherein the transceiver is configured to:
 receive a bit sequence sent by the network device comprising at least two bits corresponding to at least two terminal device groups each including a plurality of terminal devices, and data carried on each bit being used to indicate whether a terminal device in a corresponding terminal device group releases the context information;

wherein the processor is configured to:
 determine a first terminal device group to which the first terminal device belongs, the at least two terminal device groups comprising the first terminal device group;
 obtain a value carried on a first bit corresponding to the first terminal device group; and
 determine whether to release the context information according to the value carried on the first bit.

15. The terminal device according to claim 14, wherein the transceiver is further configured to:
 receive criterion information sent by the network device, the criterion information being used by the first terminal device to determine whether to release the context information.

16. The terminal device according to claim 15, wherein the criterion information comprises a first threshold; wherein the processor is configured to:
 in response to the value carried on the first bit being 1, and a remainder between an identifier of the first terminal device and a second threshold being equal to the first threshold, determine to release the context information.

17. The terminal device according to claim 16, wherein the criterion information further comprises the second threshold.

* * * * *